United States Patent
David et al.

(10) Patent No.: US 10,380,344 B1
(45) Date of Patent: Aug. 13, 2019

(54) SECURE CONTROLLER OPERATION AND MALWARE PREVENTION

(71) Applicant: Karamba Security, Hod Hasharon (IL)

(72) Inventors: Tal Efraim Ben David, Hogla (IL); Assaf Harel, Ramat Hasharon (IL); Amiram Dotan, Birmingham, MI (US); David Barzilai, Hod Hasharon (IL)

(73) Assignee: KARAMBA SECURITY LTD., Hod Hasharon (IL)

( * ) Notice: Subject to any disclaimer, the term of this patent is extended or adjusted under 35 U.S.C. 154(b) by 0 days.

(21) Appl. No.: 16/205,725

(22) Filed: Nov. 30, 2018

Related U.S. Application Data

(63) Continuation of application No. 16/011,906, filed on Jun. 19, 2018, now Pat. No. 10,176,326.

(51) Int. Cl.
*G06F 21/00* (2013.01)
*G06F 21/56* (2013.01)
(Continued)

(52) U.S. Cl.
CPC .......... *G06F 21/566* (2013.01); *G06F 21/554* (2013.01); *G06F 21/577* (2013.01);
(Continued)

(58) Field of Classification Search
CPC .... G06F 21/566; G06F 21/577; G06F 21/606; G06F 21/64; H04L 63/101; H04L 63/1441; H04L 63/20; H04L 67/12
See application file for complete search history.

(56) References Cited

U.S. PATENT DOCUMENTS

| 8,090,816 B1 | 1/2012 | Deshmukh |
| 8,555,385 B1 | 10/2013 | Bhatkar et al. |

(Continued)

FOREIGN PATENT DOCUMENTS

| EP | 2892199 | 7/2015 |
| WO | WO 2013/063474 | 5/2013 |
| WO | WO 2016/046819 | 3/2016 |

OTHER PUBLICATIONS

International Search Report and Written Opinion in International Application No. PCT/IB2017/051964, dated Jun. 26, 2017, 19 pages.

(Continued)

*Primary Examiner* — Tri M Tran
(74) *Attorney, Agent, or Firm* — Finnegan, Henderson, Farabow, Garrett & Dunner LLP

(57) ABSTRACT

In one implementation, a method for providing security on an externally connected controller includes launching, by the controller, a kernel level security layer that includes a whitelist of permitted processes on the controller, the whitelist being part of a custom security policy for the controller; receiving, at the security layer, a request to run a particular process; determining, by the security layer, a signature for the particular process; identifying, by the security layer, a verified signature for the process from the whitelist; determining, by the security layer, whether the particular process is permitted to be run on the controller based on a comparison of the determined signature with the verified signature from the whitelist; and blocking, by the security layer, the particular process from running on the automotive controller based on the determined signature not matching the verified signature for the process.

18 Claims, 13 Drawing Sheets

(51) Int. Cl.
*G06F 21/64* (2013.01)
*H04L 29/06* (2006.01)
*G06F 21/60* (2013.01)
*G06F 21/57* (2013.01)
*G06F 21/55* (2013.01)
*H04L 29/08* (2006.01)

(52) U.S. Cl.
CPC ............ *G06F 21/606* (2013.01); *G06F 21/64* (2013.01); *H04L 63/101* (2013.01); *H04L 63/1441* (2013.01); *H04L 63/20* (2013.01); *H04L 67/12* (2013.01)

(56) References Cited

U.S. PATENT DOCUMENTS

| | | | |
|---|---|---|---|
| 8,863,284 B1* | 10/2014 | Polyakov | H04L 63/145 726/22 |
| 8,950,007 B1* | 2/2015 | Teal | G06F 21/554 726/30 |
| 9,177,153 B1* | 11/2015 | Perrig | G06F 21/57 |
| 2010/0251328 A1 | 9/2010 | Syed et al. | |
| 2011/0083186 A1 | 4/2011 | Niemela | |
| 2013/0086625 A1 | 4/2013 | Driscoll et al. | |
| 2013/0097660 A1 | 4/2013 | Das et al. | |
| 2013/0097708 A1 | 4/2013 | Jayanthi et al. | |
| 2013/0185795 A1* | 7/2013 | Winn | H04L 63/0236 726/23 |
| 2014/0136710 A1 | 5/2014 | Bernari et al. | |
| 2015/0150124 A1* | 5/2015 | Zhang | H04L 63/1408 726/22 |
| 2016/0149887 A1* | 5/2016 | Katmor | H04L 63/0263 726/1 |

OTHER PUBLICATIONS

International Search Report and Written Opinion in International Application No. PCT/IB2017/051965, dated Aug. 18, 2017, 20 pages.
International Search Report and Written Opinion in International Application No. PCT/IB2017/051967, dated Jun. 12, 2017, 17 pages.
Anonymous, "Method for Protecting Code from Running in Unlicensed Environinents", IP. Comm Journal, Jun. 17, 2014, 1-2.
International Search Report and Written Opinion in International Application No. PCT/IB2017/05195S, dated Jun. 19, 2017, 22 pages.
Panasonic—Automotive Intrusion detection (obtained on Sep. 14 by Google phrase "ECU intrusion detection" (Year: 2017).
Jun Li—Automotive Intrusion detection (obtained on Sep. 14 by Google phrase ECU intrusion detection (Year: 2017).

* cited by examiner

SECURE CONTROLLER OPERATION AND MALWARE PREVENTION

CROSS-REFERENCE TO RELATED APPLICATION

This application is a continuation of U.S. patent application Ser. No. 16/011,906, filed on Jun. 19, 2018, which is a national stage application of PCT Application No. PCT/IB2017/051964 filed Apr. 5, 2017, which claims priority to U.S. Provisional Application Ser. No. 62/319,178, filed on Apr. 6, 2016, and U.S. Provisional Application Ser. No. 62/346,856, filed Jun. 7, 2016, the disclosures of which are incorporated herein by reference.

TECHNICAL FIELD

This specification generally relates to security for computer-based controllers, such as controllers for Internet of Things (IoT) devices.

BACKGROUND

More devices are becoming "smarter" with hardware and software that permit them to communicate via the internet, such as through cellular wireless networks, Wi-Fi, and Bluetooth. These internet-connected devices are often identified as being part of the "Internet of Things" (IoT), which is a term that broadly encompasses internet-connected devices configured to transmit and receive information related to their operation, such as status information. For example, many consumer products are now IoT devices with internet-connected features, such as home automation devices (e.g., wirelessly controllable light switches), appliances (e.g., smart refrigerators able to transmit images of the fridge's contents), and automobiles (e.g., internet-connected components, such as infotainment and navigation devices). For instance, modern vehicles can have over 100 controllers, or Electronic Control Units (ECUs), that are responsible for running most of the car's functions, such as the steering wheel, engine, braking system, airbags, and navigation systems.

Like any other externally connected computers, IoT devices (e.g., ECUs in connected cars) are vulnerable to cyber attack and have become targets for hackers. For example, controllers on several makes and models of cars, such as the JEEP CHEROKEE, TOYOTA PRIUS, TESLA MODEL S, and NISSAN LEAF, have been successfully targeted and exploited by white hat hackers. Those hackers were able to compromise the vehicles and take command of nearly all of the control aspects, ranging from turning on the radio and windshield wipers to killing the engine while the car drove on the freeway. These exploits caused some of these car manufacturers to issue a recall on affected vehicles.

Cyber attacks come in many forms and flavors, but they generally share the same basic concepts: find a preexisting security bug (vulnerability) in the system's software, exploit it, and run malware. A common security bugs is neglecting to verify the size of input buffers, which hackers can exploit by passing long buffers that get out of the boundaries allocated for that buffer on the software stack. By getting out of the buffer boundaries, hackers may be able to access and change the pointer structure that controls the functional flow of code, which hackers can use to direct the controller to execute malware code. Although malware code can vary (e.g., keylogger, ransomware, e-mail spam), the exploitation mechanism is often similar—find a security bug, research and learn how to exploit it in order to gain control, and use the control to run the malware code.

SUMMARY

This document generally describes a technological solution that hardens externally connected controllers (e.g., ECUs) within an IoT device (e.g., connected automobile) against hackers. Customized security policies for controllers can be automatically generated and added to controllers with security layers without having to modify the underlying controller software. Such security policies and layers be implemented on controllers to ensure that only valid code and valid behaviors are allowed to run on the controllers, which can maintain secure operation and prevent the attacks from ever infiltrating the IoT device's infrastructure, such as a car's Controller Area Network (CAN Bus).

By focusing on hardening the controllers within IoT devices/systems that are open to external access (via the Internet, WiFi, Bluetooth, etc.)—meaning restricting the operations and behavior of the controllers to a set of expected operations and behaviors—the controllers can be transformed from potential security vulnerabilities into gates that prevent and block hacker attempts to get into the controller's internal infrastructure, essentially stopping hacker attacks on IoT devices. Endpoint security layers can stop attacks on controller by blocking hackers at the gate—meaning an externally facing entry point into a device and/or system, such as at externally facing ECUs in an automobile that, if compromised, could provide access to the CAN Bus. As a result, attacks cannot make it inside of an IoT device/system, which can prevent access to and control of an IoT device/system's functions.

This document describes four general aspects. First, automatic security policy generation which includes automatically generating custom security policies that can be implemented on controllers without manual design. Second, secure controller operation and malware prevention using custom security policies that have been incorporated into controllers. Third, securely logging and reporting information on controller operation, such as the current status of a controller and blocked malware attempts, back to a central management computer system in real time without affecting controller performance/operation. Fourth, providing a centralized computer system to aggregate information from multiple devices using the same controllers, to provide for global device/controller views and analytics, including identifying and detecting anomalous controller operation.

While this document describes all four of these aspects, this document focuses on secure controller operation and malware prevention. In particular, this aspect involves integrating an endpoint security client into the operating system of a controller. Such an endpoint security client can include one or more security layers, such as a multi-layered whitelist enforcement, a network firewall, and a port protection agent. For example, a whitelist layer can include a list of signatures for every binary (and/or script) code in the system, which kernel modules can be checked against upon execution to verify their authenticity. Other whitelist layers, such as a function graph, can be designed to battle in memory attacks (such as the buffer overrun). For example, a graph can include allowed sequences of function calls in the system and, during runtime, can be used to verify that the sequence of calls in the software stack is one of the legitimate sequences identified in the graph. When operation is detected outside of the approved parameters included in a custom security policy for a controller, it can indicate that that a malware is attempting exploit a vulnerability (i.e., software bug) on the controller to run unauthorised code in memory, and can be blocked and reported.

In one implementation, a method for providing security on an externally connected controller includes launching, by the controller, a kernel level security layer that includes a whitelist of permitted processes on the controller, the whitelist being part of a custom security policy for the controller; receiving, at the security layer, a request to run a particular process; determining, by the security layer, a signature for the particular process; identifying, by the security layer, a verified signature for the process from the whitelist; determining, by the security layer, whether the particular process is permitted to be run on the controller based on a comparison of the determined signature with the verified signature from the whitelist; and blocking, by the security layer, the particular process from running on the automotive controller based on the determined signature not matching the verified signature for the process.

Such a method can optionally include one or more of the following features, which can be combined in each possible sub-combination of features. The whitelist can be generated for the controller based on static analysis of an operating system for the controller. The method can further include reporting, by the controller and to a server system, information that identifies the particular process as being blocked, wherein the information is reported to the server system without the particular process being executed by the controller and without prior transmission with the server system regarding the particular process. Launching the security layer can include registering, by the security layer, one or more hooks for one or more kernel level processes on the controller, the hooks causing calls to the one or more kernel level processes to be forwarded to the security layer with (i) process information identifying a kernel level process being called and (ii) a pointer to the called process. The request to run the particular process can be received through the one or more hooks. The signature for the particular process can be determined using a particular pointer for the particular process. The verified signature can be identified using a particular process information for the particular process.

The method can further include invoking, by the security layer, a stack inspection operation. The stack inspection operation can include obtaining, by the security layer, a snapshot of a software stack for the controller; accessing, by the security layer, a process map from the custom security policy for the controller, the process map identifying permitted sequential process calls on the controller; determining, by the security layer, whether a current sequence of process calls in the software stack is permitted under the custom security policy based on a comparison of the snapshot with the process map; and blocking, by the security layer, operation of one or more processes on the controller in response to determining that the current sequence of process calls is not permitted. The stack inspection operation can be invoked in response to the request to run the particular process. The one or more processes that are blocked can include the particular process. The stack inspection operation can be invoked in response to a non-maskable interrupt being triggered on the controller.

The particular process can include an identified network process on the controller. The method can further include identifying, by the security layer, a network packet to be transmitted or received as part of the particular process; determining, by the security layer, an IP address and a port for the network packet; identifying, by the security layer, one or more verified IP addresses and one or more verified ports for the particular process from a network and port whitelist; determining, by the security layer, whether the network packet is permitted to be transmitted or received through the particular process based on a comparison of (i) the determined IP address and port with (ii) the verified IP address and port for the particular process from the network and port whitelist; and blocking, by the security layer, the network packet from being transmitted or received by the controller based on the determined IP address or port not matching the verified IP address and port. The network and port whitelist can be part of the custom security policy and was generated for the controller based on static analysis of an operating system for the controller. The controller can include an automotive electronic control unit (ECU). The method can further include running, by the security layer, one or more anti-tampering agents that check operation of the security layer; and providing, by the one or more anti-tampering agents, an alert in response to determining that one or more portions of the security layer are not operating according to one or more parameters.

Certain implementations can provide one or more of the following advantages. For example, endpoint controller security can us an operating system (OS) agnostic security agent and is built with an OS-specific middleware and a general purpose security agent. Such a security agent can be deployed in externally connected controllers to perform a variety of security-related functions, such as enforcing automatically generated security policies, collecting forensics information and upload it to the cloud, and/or providing anti-tampering features to prohibit hackers from circumventing the security agents. Such OS-agnostic agents can allow for endpoint security to be readily configured and deployed across a wide variety of vehicle controllers and OS environments.

In another example, the system can be integrated with the OEM/manufacturer build environment for controllers to automatically generate security agents and policies that are specific to the controllers, which can then be deployed to harden controllers and prevent security breaches. For instance, a client (or other software application/module) integrated into a build environment for a controller can scan the code and the binary for the controller, and automatically generate a security policy that is specific to the controller. Such scanning and automatic generation can include, for example, using static analysis tools and techniques to identify the universe of permitted processes, binaries, scripts, network usage, and/or other controller behaviors that are used to generate a customized security policy for the controller. Such as security policy can include, for example, a whitelist (e.g., identification of permitted processes, binaries, functions, operations), network firewall (e.g., identification of permitted network ports, IP addresses), functional graph (e.g., mapping and/or sequence of functions performed by a controller), and/or additional features that model permitted/designed behavior of the controller. Such automatic security policy generation (e.g., during build, due to static analysis (and other tools, such as simply signing on binaries to add to a whitelist)) can permit for endpoint security to be added to controllers with little to no effort on behalf of controller manufacturers/vendors, who can simply run the automated security policy generator prior to deployment in order to add endpoint security to their controller.

In a further example, a server system (e.g., cloud-base system) can be used to manage and monitor controllers that are hardened with endpoint security. Such as server system can processes and generate reports regarding controllers, such as information on detected and blocked malware, the current state of controllers in a vehicle, and/or other relevant information. Such reports can be at any of a variety of levels of granularity, from vehicle-specific views to manufacturer-specific views to the industry-wide views, which can be based on aggregated and anonymized user/vehicle/manufacturer information. For instance, a server system can collect forensics information in order to display incident reports based on malware detection, to calculate anomaly detection, to display current state of cars on the roads, to provide a management console in order to enhance policies (in production and during build—i.e. the cloud system is also connected to the project while it's being developed), and/or other relevant features. Such features can allow for manufacturers, vendors, and/or other interested/authorized parties (e.g., government agencies) to better understand both the micro and the macro security threats that are posed by externally connected controllers as well as the current security status (e.g., secure, under attack) of vehicles on the road. Such features can additionally permit for anomaly detection based prevention, such as through analyzing device measurements (e.g., CPU load, memory usage, I/O usage, etc.) that, by themselves, are not statistically significant, but when analyzed over time can indicate anomalies. For example, taking device measurements over time, average values (e.g., avg. CPU load, avg. memory usage, avg. I/O usage, etc.) can be determined, and when N>x, the standard deviation of the average is so small (e.g., alpha<0.00001) that it can serve as a base line for anomaly prevention and not just detection—meaning it can be accurate enough to block anomalies before/while they are occurring instead of after they have occurred.

In another example, endpoint controller security can permit detection that is much earlier than network-based solutions, which often are not able to detect that malware has compromised a controller until after the malware has had a chance to run. In contrast, endpoint security detects the malware before it has a chance to run on a controller, which not only prevents the malware from ever being executed but also determines that an operation is malware before it has been executed.

In a further example, endpoint security can readily be retrofitted for existing externally connected controllers that were not originally designed or manufactured with endpoint security in mind. This is possible through the automatic security policy generation features described above, which allow for security policies to be generated and readily deployed for controllers with little effort from manufacturers/vendors, and allow for endpoint security to be added to controllers through simple controller updates. Retrofitting can enhance security versions for existing vehicles on the road today, regardless of whether they were originally designed to include endpoint security.

In another example, rather than looking for hackers that are already in an IoT device/system's internal network (e.g., CAN Bus, internally-facing controllers), the disclosed technology can detect and stop an attack from getting into the internal network (e.g., CAN Bus, other controllers) in the first place. For example, the disclosed end-point solution can provide an early intrusion detection system that can protect externally connected controllers, which can allow for early intrusion detection and identification of threats targeting the IoT device/system and blocking exploits from infiltrating its internal components, which can ensure device/system and/or user safety.

Additional and/or alternative advantages are also possible, as described below.

BRIEF DESCRIPTION OF THE ATTACHMENTS

Figure 3A:
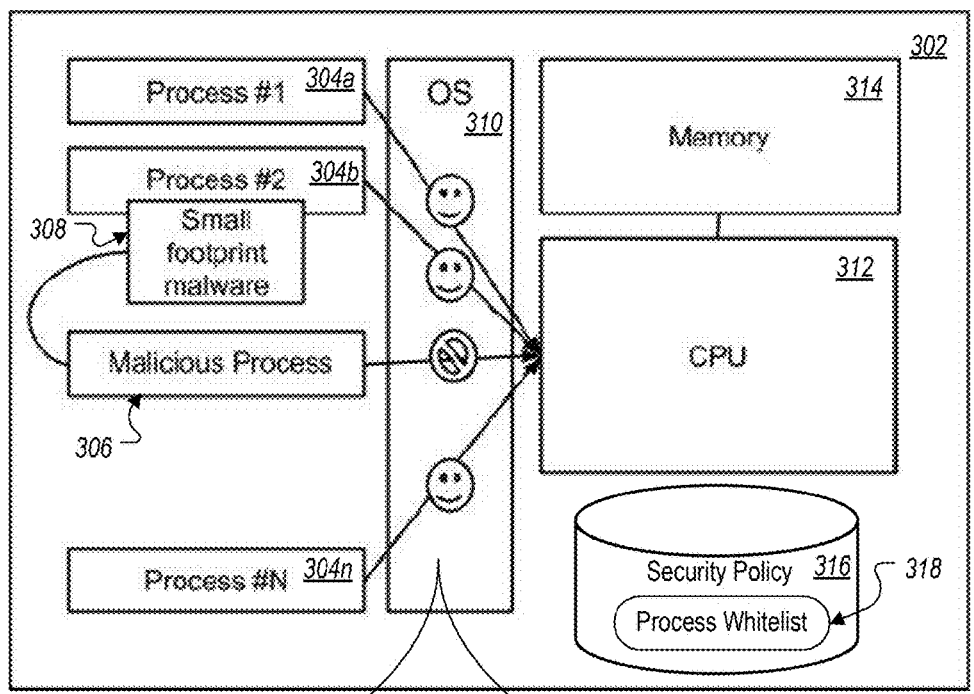
Figure 3A:
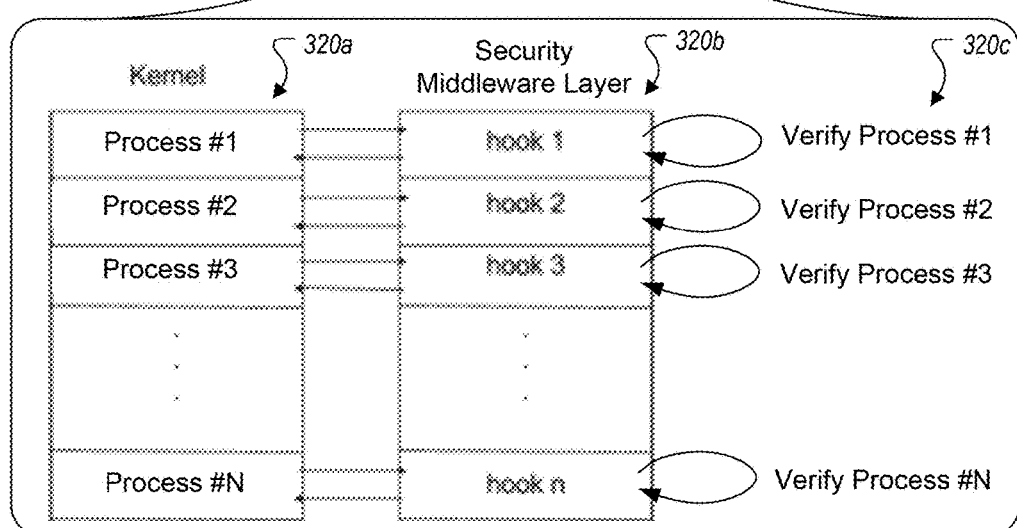
Figures 3B, 3C:
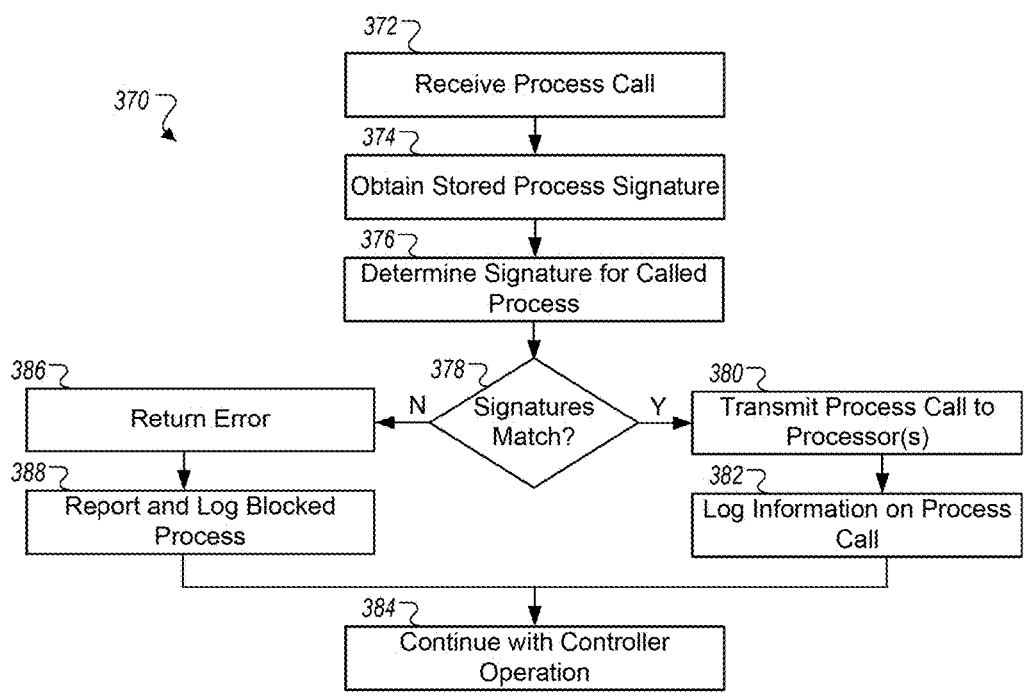

FIGS. 3A-C depict examples implementations of process verification by a security middleware layer on a controller.

Figure 4A:
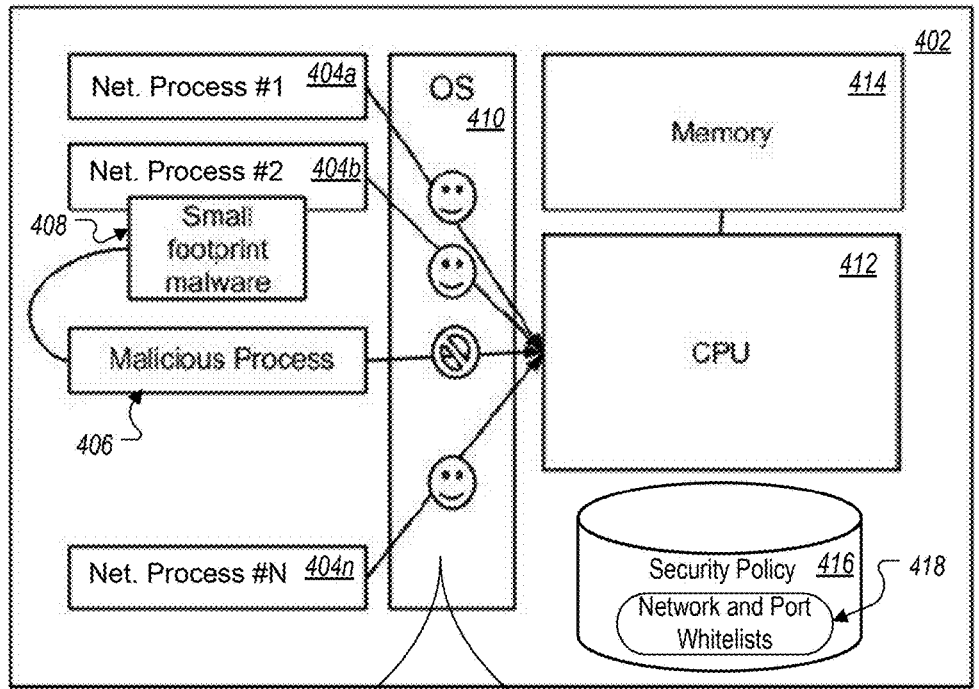
Figure 4A:
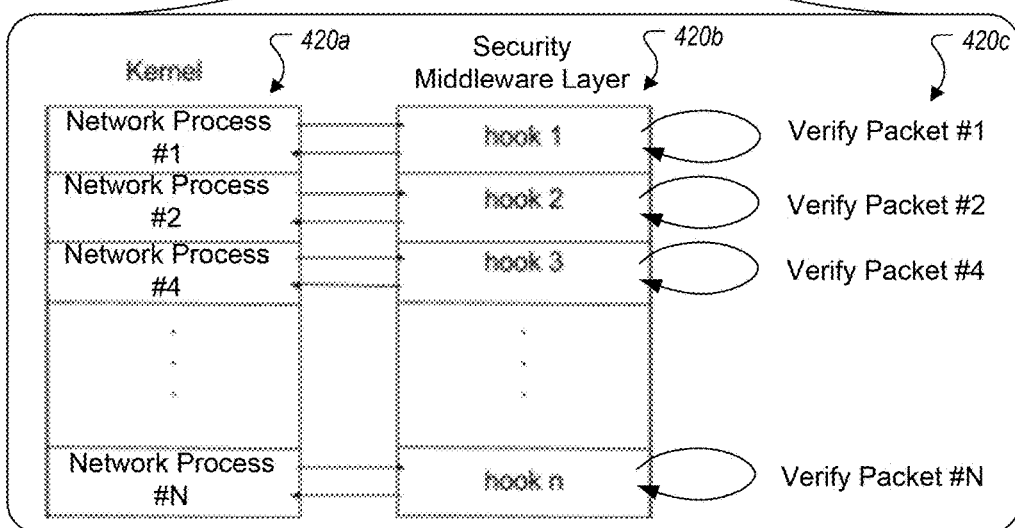
Figures 4B, 4C:
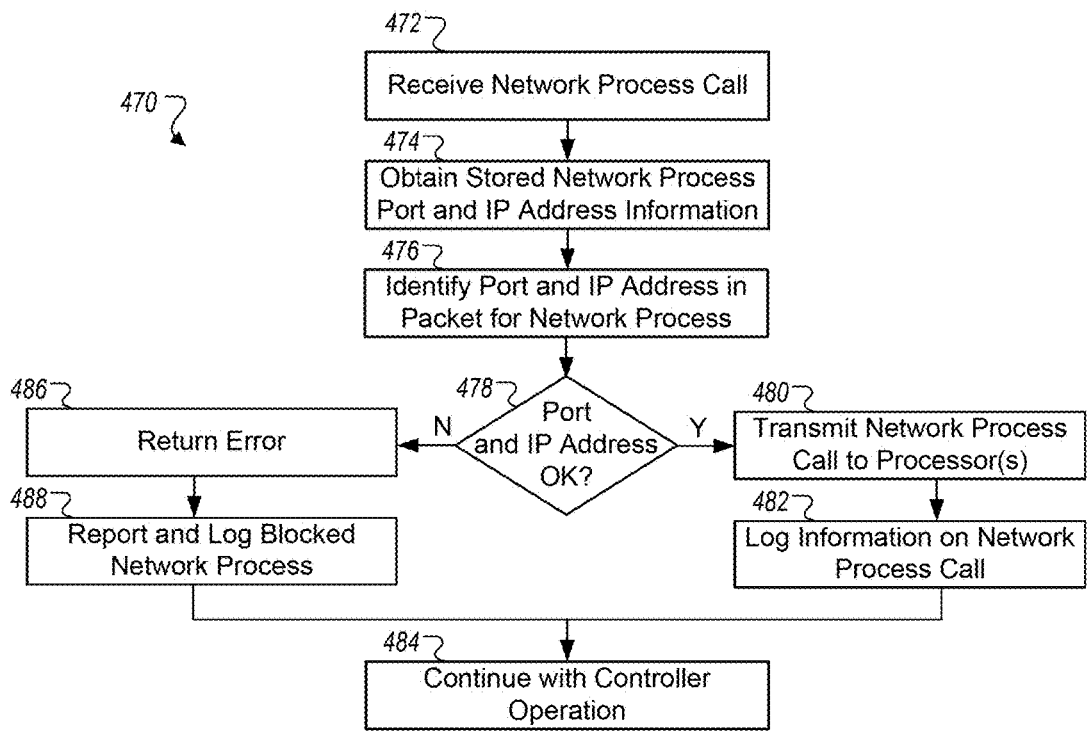

FIGS. 4A-C depict examples implementations of a network firewall and port protection agent by a security middleware layer on a controller.

Figure 5A:
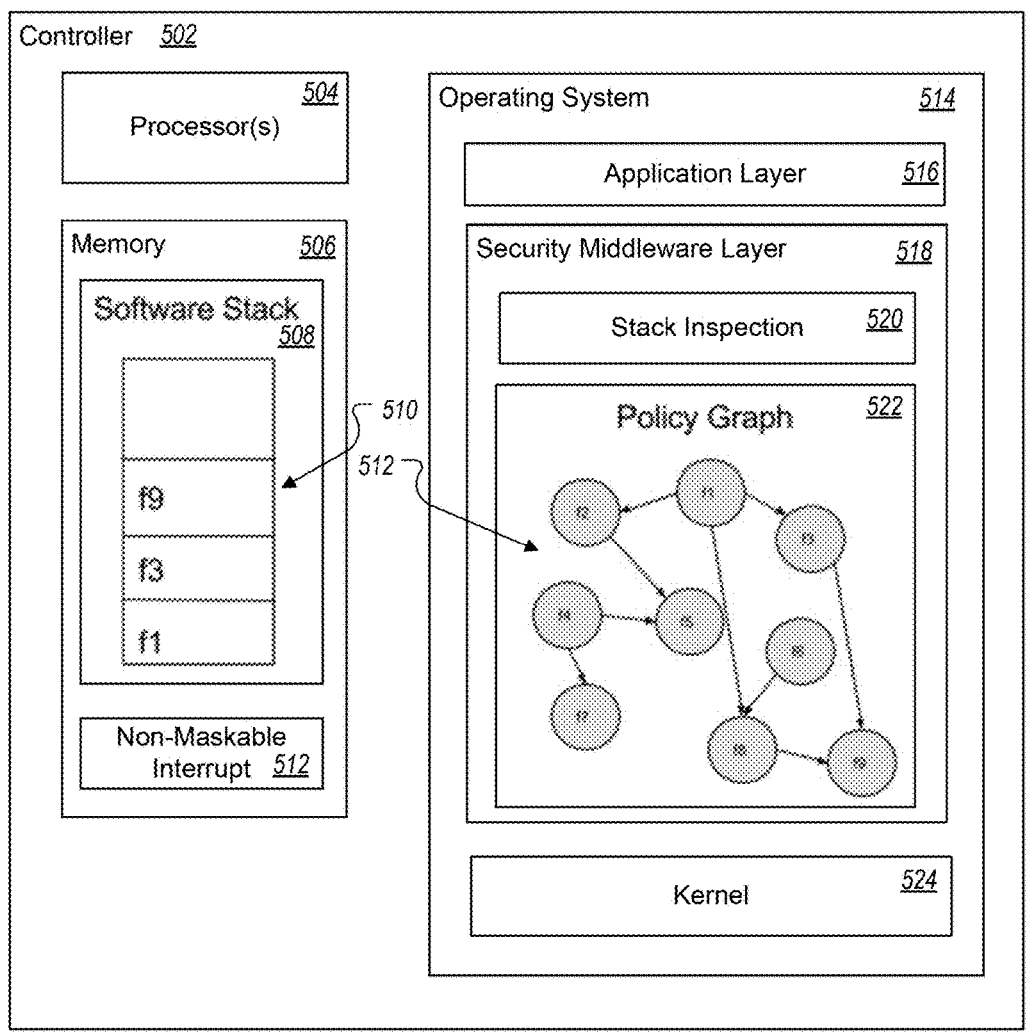
Figure 5B:
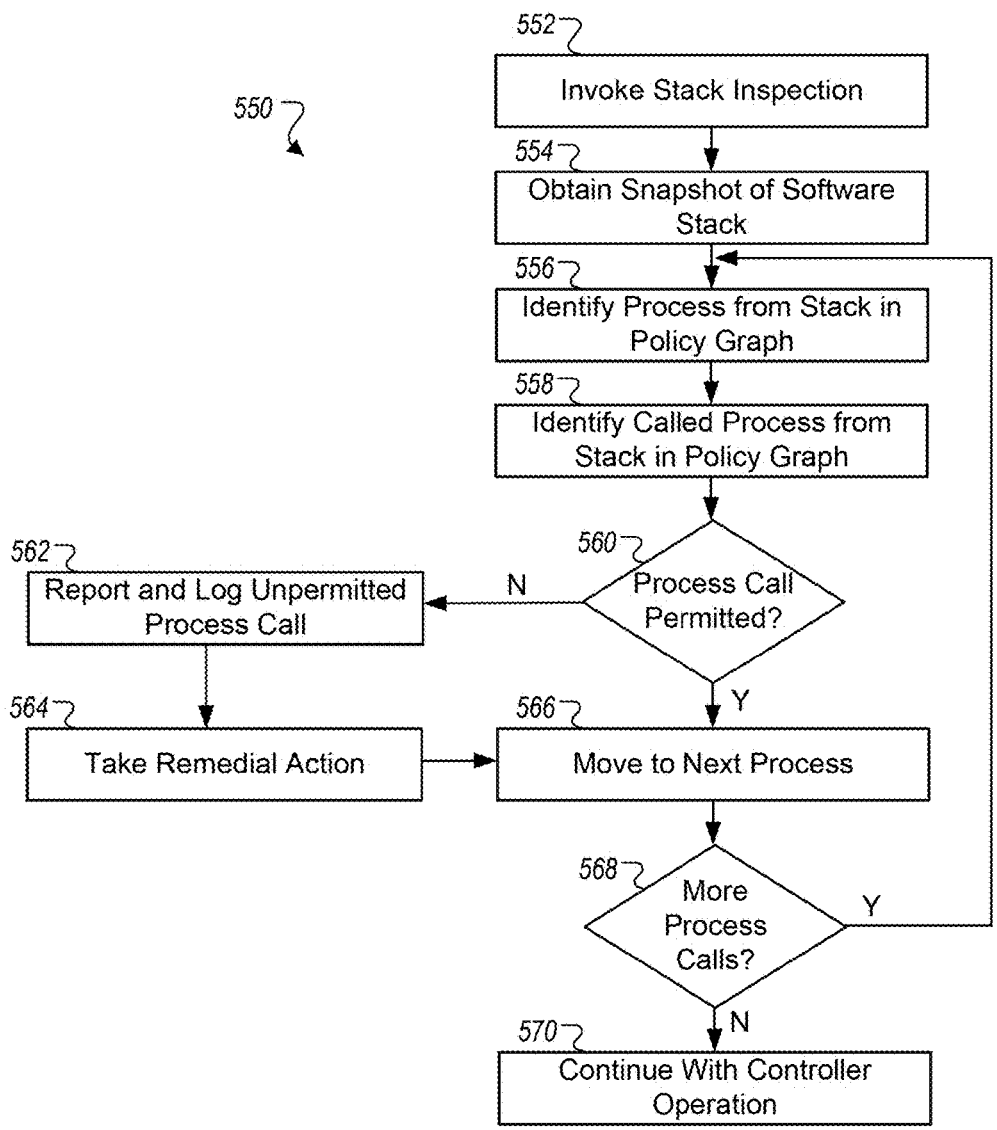

FIGS. 5A-B depict examples implementations of a stack inspection agent that is part of a security middleware layer on a controller.

Figure 6A:
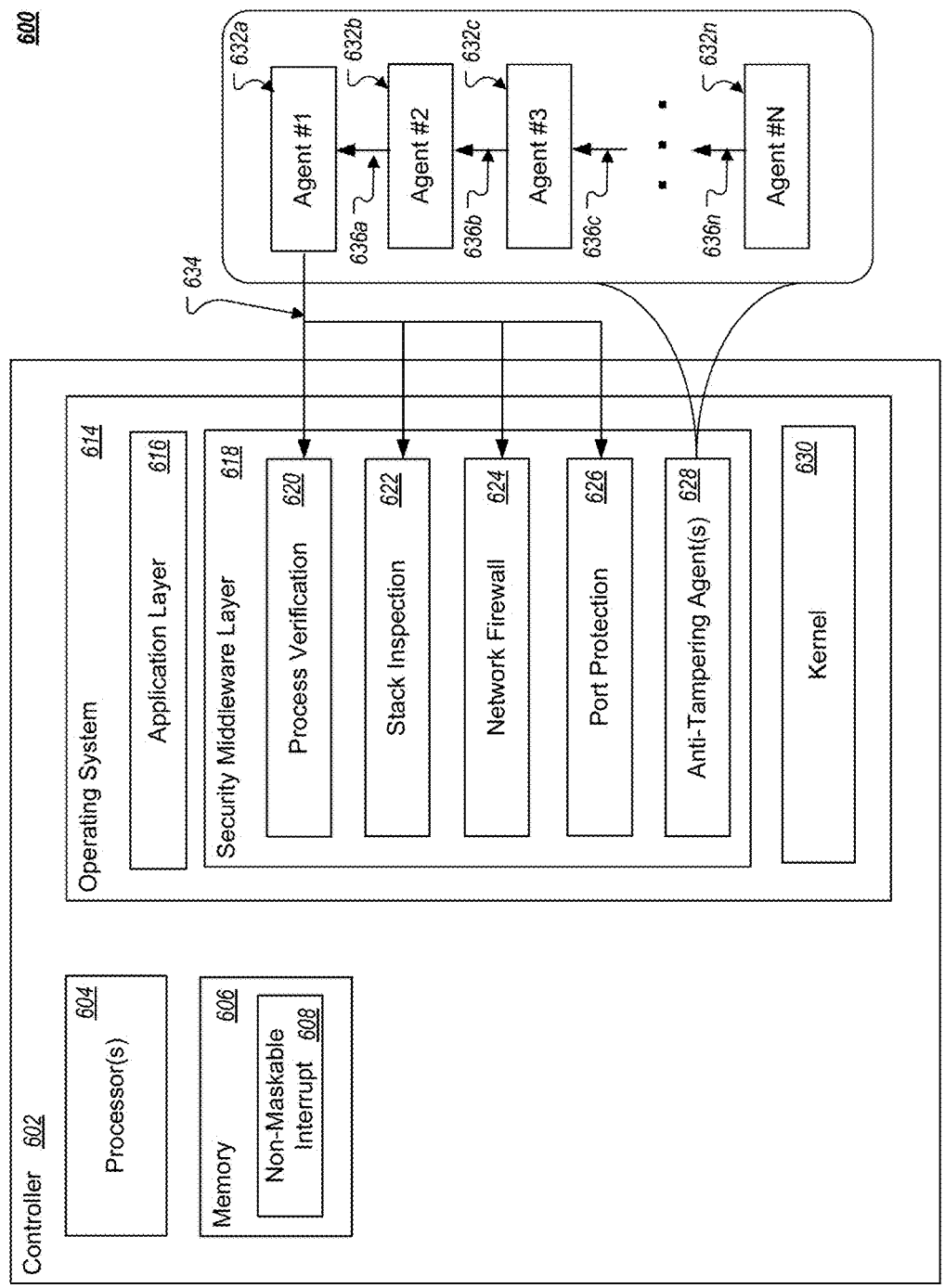
Figure 6B:
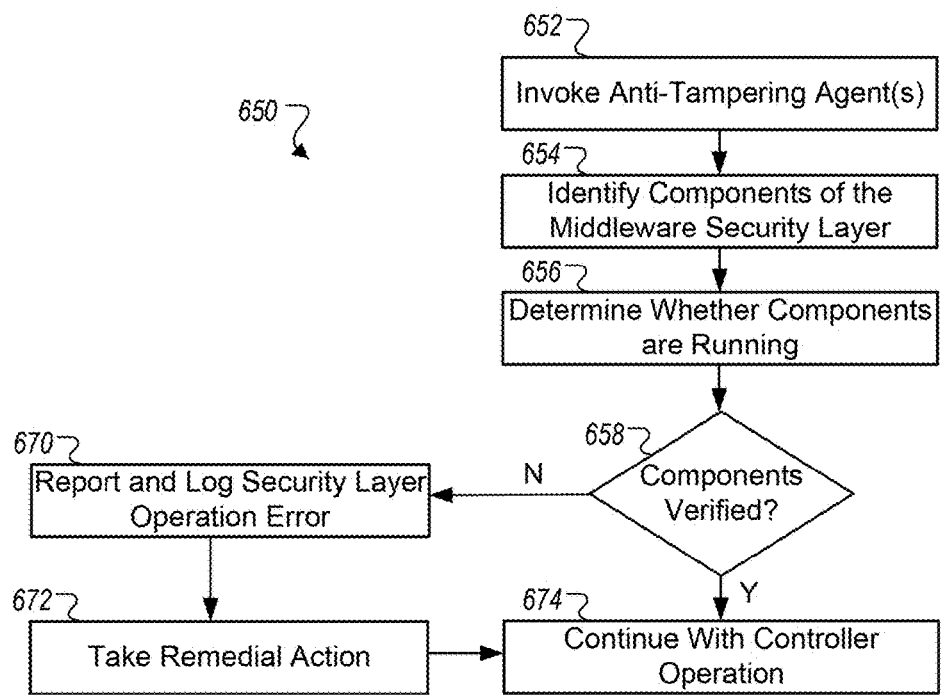

FIGS. 6A-B depict examples implementations of anti-tampering agents that are part of a security middleware layer on a controller.

Figure 7:
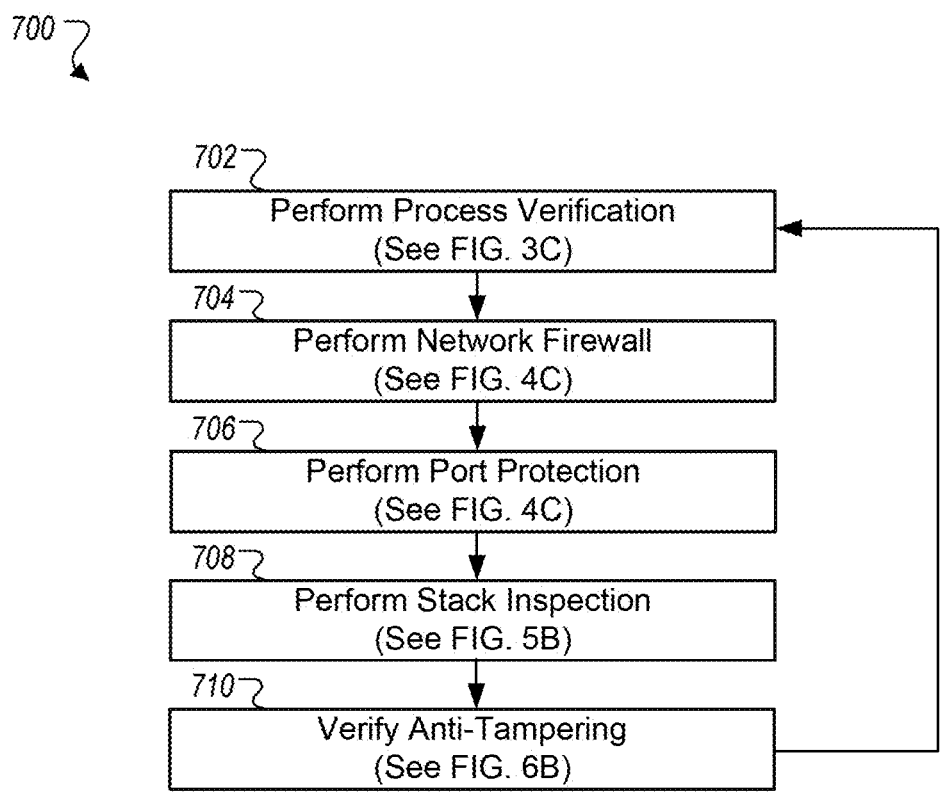

FIG. 7 is an example technique 700 for providing secure operation and malware prevention on a controller using a security middleware layer.

Figure 8:
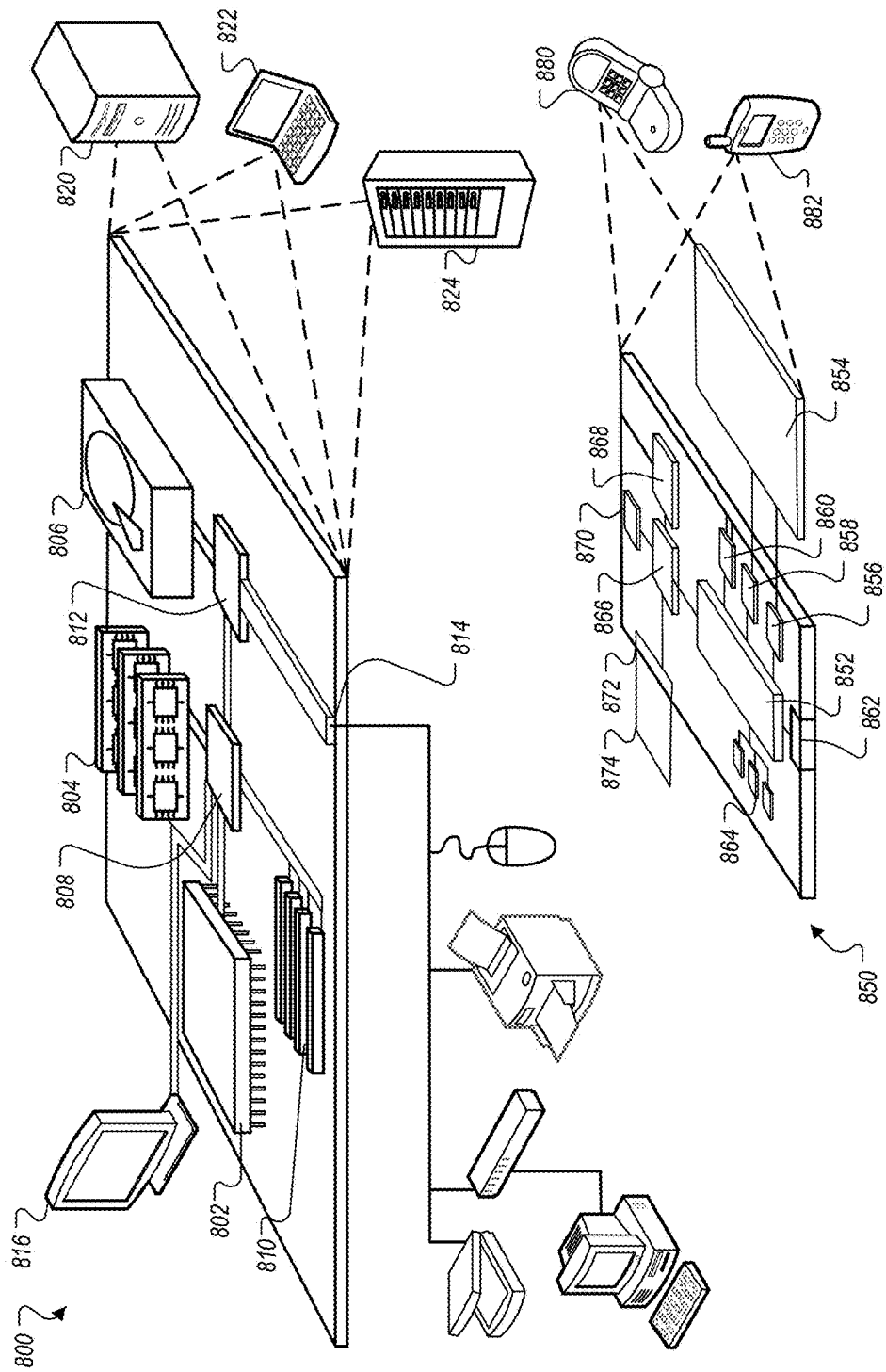

FIG. 8 is a block diagram of example computing devices.

Like reference numbers and designations in the various drawings indicate like elements.

DETAILED DESCRIPTION

Figure 1A:
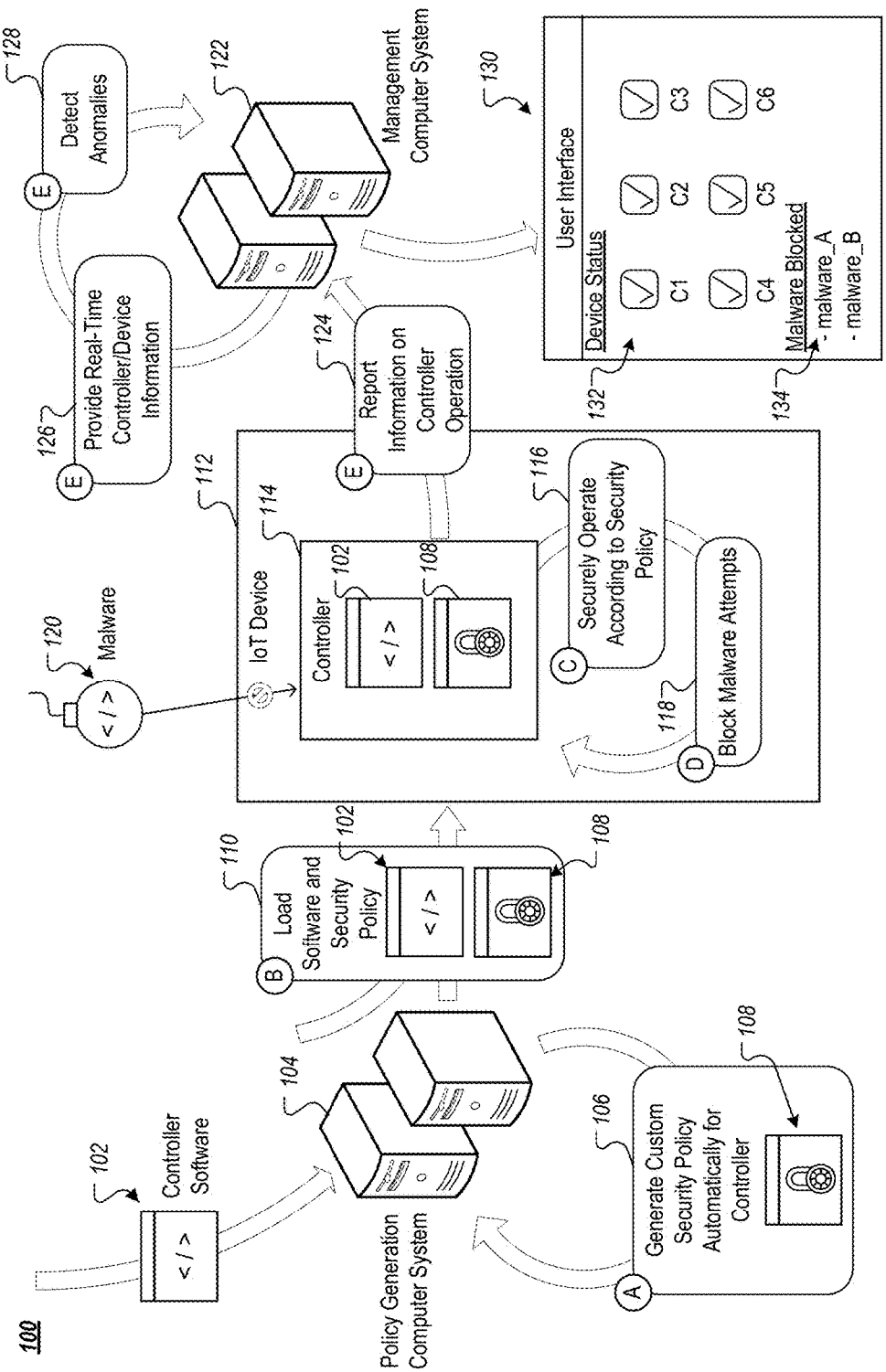
FIG. 1A is a conceptual diagram of an example system for generating and implementing a custom security policy on an example controller.

FIG. 1A is a conceptual diagram of an example system 100 for generating and implementing a custom security policy on an example controller. The example system 100 includes a policy generation computer system 104 (e.g., computer server system, cloud computing system, client computing device) that is programmed to automatically generate a custom security policy for a controller, an example IoT device 112 (e.g., ECU) that includes an example controller 114 that will use the generated security policy to operate securely and to prevent malware, and a management computer system 122 (e.g., computer server system, cloud computing system, client computing device) that is programmed to receive real-time controller information, to detect anomalous controller behavior, and to provide an interface for users to view real-time controller/device status information. Although not depicted, the system 104, the IoT device 112, and the system 122 can communicate over one or more communication networks, such as the internet, local area networks (LAN), wide area networks (WAN), virtual private networks (VPN), wired networks, wireless networks, mobile data networks, or any combination thereof.

The policy generation computer system 104 can receive controller software 102, which can include an operating system and/or applications that are to be run on a controller. The controller software 102 can include binary code, for example, which can be disassembled (e.g., by the policy generation computer system 104) prior to being analyzed to generate a custom security policy. The policy generation computer system 104 can use the controller software to automatically generate a custom security policy 108 for the controller that is to execute the software 102, as indicated by step A (106). For example, the computer system 104 can analyze the software 102 to determine a set of operations and behaviors that are expected during operation of a controller according to the software 102, and can incorporate those operations and behaviors into the custom security policy 108, which may include one or more whitelists of permitted operations and/or behaviors. Generating the security policy can additionally include generating one or more signatures for components of the controller software 102, such as processes/functions that are part of the software 102, that can be used to verify that the code being executed as part of the software 102 is authentic and has not been modified/altered/replaced by malware. By automatically generating a security policy 108 from the controller software 102—meaning without needing manual design for implementation/generation—the system 100 can reduce the burden, cost, and time to generate and implement security layers on controllers, which can increase controller security.

The policy generation can be performed by the computer system 104 in a way that does not necessitate any sort of modification to the controller software 102. For example, the custom policy 108 can be separate from and not rely on modification of the software 102 in order to operate. By generating and implementing the security policy 108 without having to modify or alter the controller software 102, the system 100 can additionally reduce the burden on security layer implementation, which can increase security layer implementation and overall controller security. For example, if the controller software 102 were to be modified in significant ways in order to incorporate the security policy 108, the software 102 would need to be verified and tested again after the security policy 108 has been integrated into the system, which can slow time to deployment and can delay the incorporation of security layers on controllers.

The computer system 104 (and/or other computer systems, such as original equipment manufacturers (OEM)) can load the software 102 and the security policy 108 for the controller 114 of the IoT device 112, as indicated by step B (110). For example, the controller software 102 and the security policy 108 can be flashed onto the controller 114.

The controller 114 can securely operate using the controller software 102, which is confined to operating within the confines of the security policy 108, as indicated by step C (116). For example, the security policy 108 can include whitelists (and other information) that designate authorized behaviors and operations for the controller 114 that are within expected behavior according to the controller software 102. Behaviors/operations that deviate from those authorized behaviors/operations can be prevented from occurring based on the security policy 108 hardening the controller 114 against such behaviors/operations.

For example, the controller software 102 can include one or more portions of code that make the controller 114 unsecure, which can potentially affect the security of not only the controller 114 but the device 112 (and other devices to which it is connected). As described above, security vulnerabilities can come in any of a variety of different types, such as buffer overrun vulnerabilities through which a hacker could potentially modify the software stack to cause malware 120 to be loaded onto and executed by the controller 114. By operating according the security policy 108 on the controller 114, such malware attempts can be blocked before the malware 120 is loaded/executed by the controller 114, as indicated by step D (118).

Such hardening of the controller 114—meaning restriction of the controller 114 to specific behaviors/operations outlined in the security policy 108—can provide endpoint security that provides an early intrusion detection system with a variety of benefits. For example, it can allow for early intrusion detection and warning of attacks by identifying attack attempts before they are able to install/run the malware 120 on the controller 114. It can also stops attacks at the gate—meaning preventing attacks from making it onto the controller 114 and the device 112 (as opposed to other security solutions that attempt to identify malware once it has already been installed/run on a controller). It can eliminate false positives (incorrect identification of attacks) by restricting operation of the controller 114 to only the code and applications that have explicit permission to run on the controller, which can eliminate potential ambiguity (e.g., either the code is part of the factory settings or not). It can also eliminates risk of the policy 108 becoming security vulnerability itself by being outdated. For instance, by custom generating the security policy 108 to match the current version of the controller software 102, the security policy 108 can continue to harden the controller 114 as the controller software 102 is updated over time. Additionally, this is in contrast to other security policies that may use blacklists seeking to identify and prevent particular malware. Such blacklists may require constant updating and may continually run the risk of being outdated, which can expose the controller 114 to potential vulnerabilities. By using whitelists in the security policy 108 that outline permitted behaviors/operations, the security policy 108 can continue to protect the controller 114 even when new and yet unknown malware attempts are launched against the controller 114 and device 112. Quality checks can also be minimized, which can reduce time for deployment and updates. For example, endpoint security layers can be isolated within the controller 114, so there may not be a need to rest the operation of the entire device 112 (or other devices connected to the device 112) as part of the security layer deployment.

The controller 114 can log information about its operation, including blocked malware attempts as well as information on secure operation of the controller 114 over time. Traces of blocked malware attempts can include a variety of information, such as the malware itself, the origin of the malware (e.g., IP address from which the malware originated), and information identifying the code segment that provided the malware exploit. The controller 114 report information on controller operation, as indicated by step E (124). Such reporting can be provided in real-time. For example, the controller 114 can report malware traces in response to the malware 120 is attempt being blocked. The controller 114 can balance reporting with controller performance against the timeliness of reporting for less critical information, such as information about secure operation of the controller 114 during periods of time when no malware attacks were attempted/blocked. For instance, such reports can be delayed until periods of time when the controller 114 and/or the device 112 have at least a sufficient amount of processing capacity and/or network bandwidth available.

The management computer system 122 can receive reports from the controller 114 as well as from multiple other controllers and devices, and can aggregate the reports into a central database system. The reports can be used to provide real-time controller/device information, as indicated by step E (126). For example, the computer system 122 can transmit real-time information that is presented on client computing devices (e.g., mobile computing devices, laptops, desktop computers) in user interfaces, such as the example user interface 130 that includes status information 132 for example controllers C1-C6 and malware information 134 that identifies particular malware that has been blocked by these controllers. The real-time information can be at any of various levels of granularity, such as a device-level (status information for a specific device) and/or a population-level (status information across multiple devices/systems).

The computer system 122 can additionally use the information reported by controllers to detect anomalies, as indicated by step E (128). For example, the computer system 122 can use statistical analysis to identify operation/behaviors that are outside of the normal operation of a controller, such as identifying a sequence of function calls that are a statistical outlier outside of the normal operation of a controller.

Figure 1B:
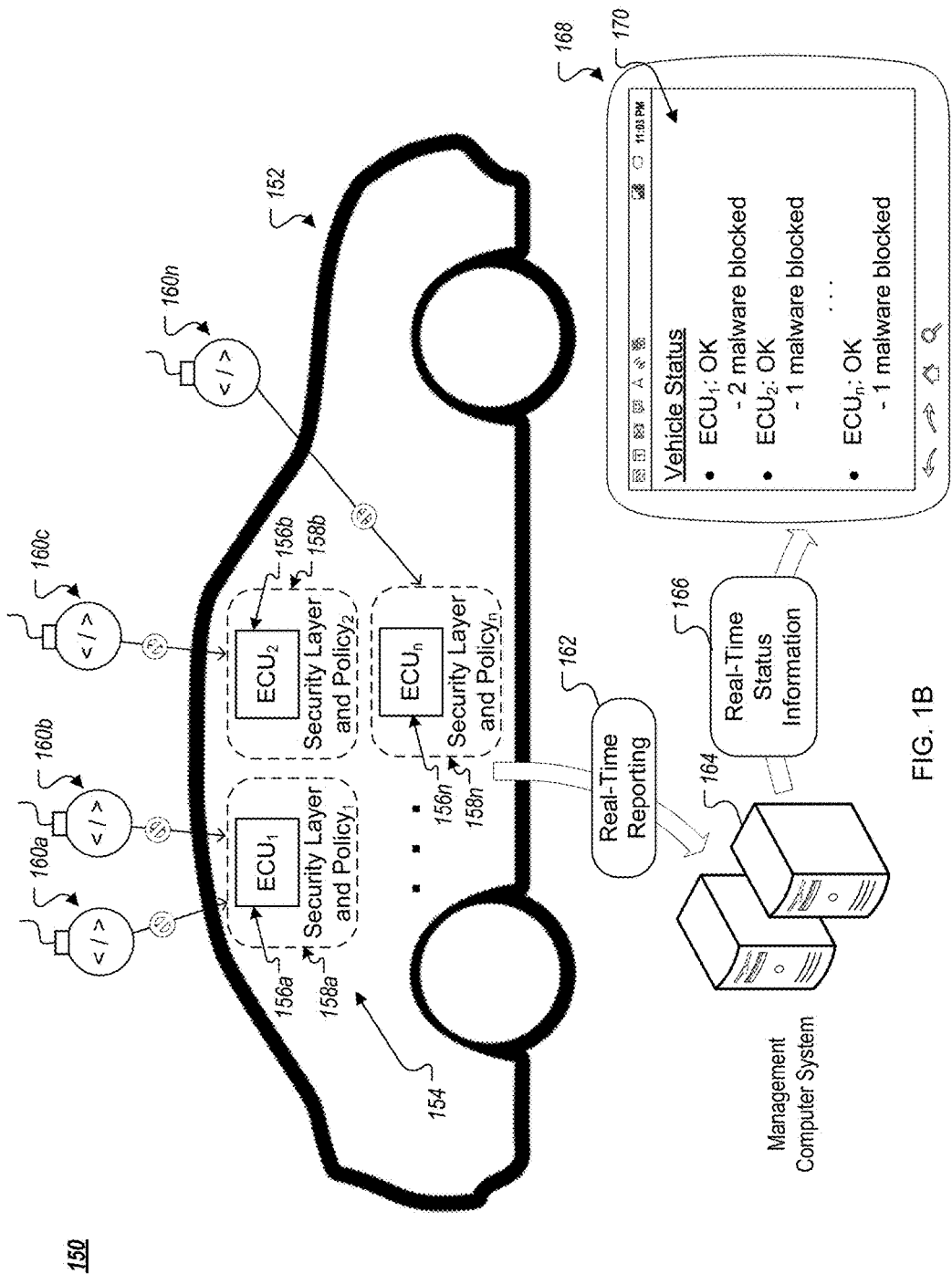
FIG. 1B is a conceptual diagram of an example system for implementing generating and implementing custom security policies on example ECUs that are part of an example vehicle.

FIG. 1B is a conceptual diagram of an example system 150 for implementing generating and implementing custom security policies on example ECUs that are part of an example vehicle 152. The example system 150 is an example implementation of the system 100 to a specific IoT context, which in this example is the vehicle 152. The system 100 and the system 150 can be implemented in a variety of other IoT contexts.

In this example, the vehicle 152 includes a control system 154 that includes multiple ECUs 156a-n that each have their own custom security policy 158a-n. Although not depicted, the security policies 158a-n can be generated in a similar manner described above with regard to FIG. 1A and the policy generation computer system 104. The security policies 158a-n can harden the ECUs 156a-n and can effectively block malware attempts 160a-n, which can be attempts by hackers to find a way into the CAN Bus of the vehicle 152. While the vehicle 152 can include over a hundred ECUs connected to the CAN Bus, only a few may be open externally (accessible to external networks outside of the vehicle 152, such as the internet). These external ECUs (e.g., ECUs 156a-n) can be the gateways into the car and the security policies 158a-n can stop attackers at these gateways, which can significantly reduce, if not eliminate, the risk of attacks penetrating the car's network, which can disrupt the car's operation.

For example, the security policies 158a-n can include whitelists for permitted program binaries, processes, scripts, network behavior, and/or other devices, and can be embedded within the ECUs 156a-n to ensure only explicitly allowed code and behavior may run on it. By using the security policies 158a-n that are specific to the ECUs 156a-n, any processes or functions that are outside of the ECUs permitted/designed operating behavior can be immediately detected and stopped from running on the ECUs 156a-n. This can allow for the ECUs 156a-n to stop malicious code from ever being executed by and possibly taking control of an ECUs' operation.

For instance, hackers targeting the vehicle 152 can use a "dropper," which is a small piece of code or operation, to try to exploit a vulnerability and implant the malware 160a-n. The malware 160a-n is the code that ultimately tampers with or takes control of the function of the vehicle 152, which can cause significant damage and put the safety of the driver and others on the road at risk. By adding an endpoint security layers and policies 158a-n to ECUs 156a-n so that they use policies outlining whitelists of permitted processes, binaries, etc., the ECUs 156a-n are able to provide an early intrusion detection system capable of early detection of unexpected behavior or operation of a dropper (example intrusions) and immediately report on the attack attempt in real-time, as indicated by step 162. The early intrusion detection and warning can give the original equipment manufacturers (OEMs) and system providers of the vehicle 152 (and its subparts) time to address the threat, as indicated by the computer system 164 providing real-time status information to a client computing device 168 with information 170 on malware that has been blocked across the ECUs 156a-n (step 166). For example, an alert on the malware 160a-n can include the complete trail of the attack on the ECUs 156a-n, including its source and path, so vulnerabilities can be fixed and blocked to prevent any malware from infiltrating the CAN Bus on the vehicle 152.

Dropper and other hacker attempts to introduce the malware 160a-n on the externally connected ECUs 156a-n can be detected by the endpoint security layers and policies 158a-n as foreign code and can be blocked when they attempts to run. For instance, such droppers and other hacker attempts are not part of the factory settings for the ECUs 156a-n, so they can be blocked from running by the security layers and policies 158a-n, which can stop them from running and prevent them from doing anything to disrupt the safe operation of the vehicle 152. If a dropper does succeed in dropping the malware 160a-n onto the externally connected ECUs 156a-n, when the malware 160a-n attempt to run on the ECUs 156a-n, the endpoint security layer and policies 158a-n can detect it as foreign code and block its attempts to run.

Endpoint security layers (e.g., security policy 108, security layer and policies 158a-n) can be implemented on newly deployed controllers and can be retrofitted on previously released controllers that may not have previously included security layers. Such retrofitting can improve the security of devices already in use and can be added as part of regular software updates that drivers receive during regular maintenance and updating. Once retrofitted, previously deployed controllers can be protected with endpoint security will be hardened against the cyber threats targeting them.

Figure 2:
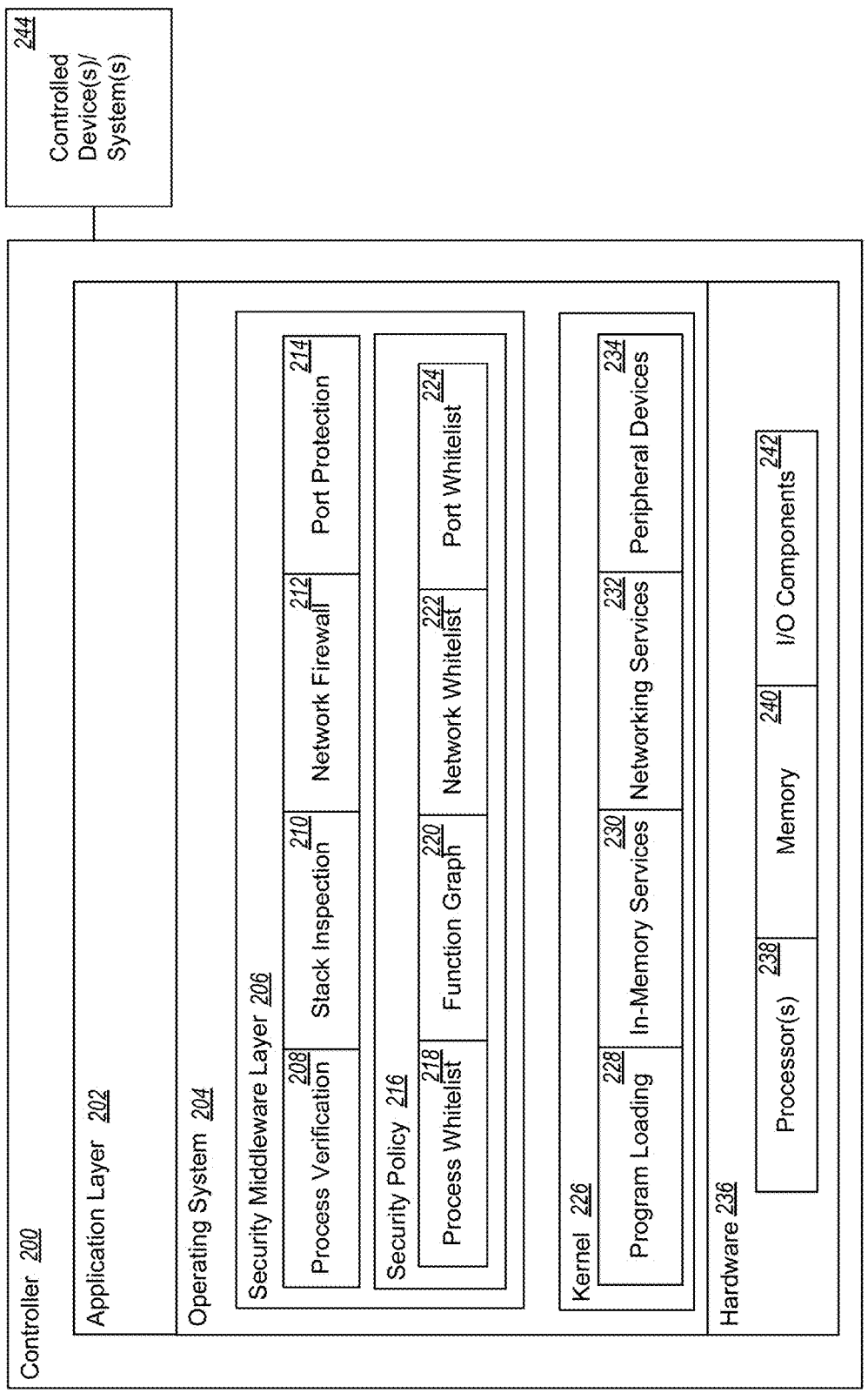
FIG. 2 is a diagram of an example controller architecture 200 for providing endpoint security.

FIG. 2 is a diagram of an example controller architecture 200 for providing endpoint security. The depicted example architecture 200 can provide endpoint security by locking-down the factory settings on the controller 200 through the use of a security middleware layer 206 that is incorporated into the operating system 204 of the controller 200. The controller architecture 200 can be implemented on other controllers described in this document, such as the controllers 102 and 156a-n.

The controller 200 includes an application layer 202 at which one or more applications operate on the controller 200 through use of an operating system 204 for the controller 200. The operating system 204 includes a kernel 226 and the security middleware layer 206, which can restrict operation of the kernel 226 to only known, authorized, and safe services that are authorized by a custom security policy 216 for the controller 200. The kernel 226 includes example processes and functions 228-234 that provide an interface for the operating system 204 to perform operations on the controller 200 using hardware 236, which includes one or more processors 238 (e.g., CPUs), memory 240 (e.g., volatile memory, non-volatile memory, RAM), and input/output (I/O) components 242 (e.g., wired and wireless network cards/chip sets). The kernel 226 includes functions/process that direct operation of the hardware 236, such as program loading processes 228 (e.g., functions to load processes into a software stack in memory 240 for execution by the processor(s) 238), in-memory services 230 (e.g., functions to allocate information into and out of memory 240), networking services 232 (e.g., processes to open network sockets and to transmit/receive network packets), and peripheral device processes 234 (e.g., processes to interface with peripheral devices).

The security middleware layer 206 includes multiple different layers of security, including a process verification agent 208, a stack inspection agent 210, a network firewall 212, and a port protection agent 214. The process verification agent 208 can verify that processes to be loaded/run by the program loading process 228 are authentic—meaning that they are the same the factory distributed processes originally loaded onto the controller 200 and that they have not been modified/altered. The process verification agent 208 can use a process whitelist 218 that is part of the security policy 218 to determine whether processes are authentic/valid and should be permitted to run, or whether they are not authentic/valid and should be blocked. For example, the process whitelist 218 permits only preset, approved programs, binaries, scripts, functions, processes, etc. to be run by the controller 200. Any attempt to launch foreign programs (unfamiliar scripts or malwares) will be blocked instantaneously by the security middleware layer 206. An example of the process verification agent 208 and the process whitelist 218 is described below with regard to FIGS. 3A-C.

The stack inspection agent 210 can use a function graph 220 that is part of the security middleware layer 206 to determine whether the current sequence of processes that are being executed on the software stack is within authorized behavior/operation of the controller 200. For example, the function graph 220 can map out permitted calls between processes/programs/binaries/scripts/etc. that are executed by the controller 200. The stack inspection agent 210 can use the function graph 220 to determine whether operations currently being performed by the controller 200 are within the expected/known parameters and should be permitted or blocked. An example of the stack inspection agent 210 is described below with regard to FIGS. 5A-B.

The network firewall 212 can control which processes/services are granted external connectivity, and can control inbound and outbound permissions using a network whitelist 222 that is part of the security policy 216. For example, the network whitelist 222 can list processes and functions that are permitted to access the networking services 232, and can scan for particular permitted connections to be made and/or received, such as communication with particular IP addresses and communication of particular types of data. An example of the network firewall 212 is described below with regard to FIGS. 4A-C.

The port protection agent 214 can control and restrict access to specific network ports, which can be for specific processes/services and/or for the controller 200 as a whole. The port protection agent 214 can use a port whitelist 224 that is part of the security middleware layer 206 to determine which ports are permitted and for which processes/services. The port protection agent 214 can additionally use the port whitelist 224 to restrict any external devices that the controller 200 has, such as USB drive, to what they can be used for (e.g. run only media files, not allowing applications, etc.). The port protection agent 214 can be used in combination with the network firewall 212, as described below with regard to FIGS. 4A-C.

Although not explicitly depicted, the security middleware layer 206 can additionally include reporting agent and layer that, for example, can collect and report forensic information and alerts on security threats, such as malware dropping attempts. The security middleware layer 206 can harden the controller 200 against malwares and other security threats, and can be integrated into the operating system 204 of the controller 200, in kernel and system levels, which can add enforcement as well as reporting and forensics capabilities.

For example, the security middleware layer 206 (and/or its individual components) can be registered as one or more drivers with the kernel 226 to be executed in response to various action being performed at a kernel level, such as particular functions that are part of the kernel processes 228-234 being called.

The controller 200 can additionally control one or more devices/system, such as the example controlled device(s)/systems(s) 244. For example, the controller 200 can be an ECU in a vehicle that controls operation of one or more components within the vehicle, such as an infotainment center, a navigation unit, an autonomous driving unit, a collision detection unit, and/or other controlled components within the vehicle.

FIGS. 3A-C depict examples implementations of process verification by a security middleware layer on a controller. FIG. 3A is a conceptual diagram depicting an example of process verification, FIG. 3B depicts an example process whitelist that can be used for process verification, and FIG. 3C is a flowchart of an example technique for performing process verification. The examples depicted in FIGS. 3A-C can be implemented, for example, by the process verification agent 208 using the process whitelist 218, which can be generated automatically for the controller 200 based on automatic security policy generation, as described above with regard to FIG. 1A.

Referring to FIG. 3A, an example system 300 is depicted with an example controller 302 using a whitelist 318 that is part of a custom security policy 316 for the controller 302 to block a malicious process 306. In this example, the processes #1-#N (304a-n) are included on the whitelist 318 for the controller 302, but the process #2 has a known exploit that is used by hackers to implant a small footprint malware 308 that then, if executed, could download a larger malicious binary that may be launched as a privileged process. A whitelist security agent that is part of a security middleware layer 320b can block the small footprint malware 308 and the larger the malicious process 306 from being executed by the controller 302 because they are not included in the whitelist 318—effectively blocking the malicious process 306 and the small footprint malware 308 from being executed by the CPU 312 and used to corrupt the memory 314 (e.g., buffer overrun attack).

For example, the whitelist 318 can include function mappings among the whitelisted processes/programs/binaries/scripts/etc. that can be referenced to determine whether operations being performed by the controller 302 are within the expected/known parameters and should be permitted or blocked. The security middleware layer 320b and its process verification agent can, for example, integrate with the OS 310 program loading and file access services, such as through the registration of loading and file access hooks with the kernel 320a so that such process calls are routed to the security middleware layer 320b for verification before being run. The term application can be an executable file, a shared object (library), a script, and/or other binary/object that is executable by the ECU 100. For example, every time a process (e.g., an executable file, a shared object (library), a script, and/or other binary/object) is loaded, the process's SHA256 signature can be calculated and compared to a database of approved process signatures (whitelist 318). If the process is approved, it will be allowed to run and will run normally on the controller 302 without any interference. If a process's signature does not exist in the whitelist database 318, the loading process can be aborted and an appropriate audit log entry can be written.

As described above, the example whitelist 318 can be generated through seamless integration of an automatic whitelist creation into a development environment to generate an automatic default whitelist policy approving all applications that are specific to the controller 302.

The security middleware layer 320b is depicted as implementing process verification using hooks. Additional and/or alternative techniques for implementing process verification are also possible. With regard to the depicted example, hooks registered with the kernel 320a and are used to redirect function calls in the kernel 320a (the hooked function call) to a process verification function (the hooking function). Accordingly, when the example process #1 is called, the registered hooks cause the registered hook function (process verification agent 208) to be invoked and to perform process verification 320c for the process #1. For example, the hook function can receive as parameters an identifier for the hooked function (e.g., unique identifier for process #1) and a pointer to the process #1 in the memory 314. The hook function (process verification agent 208) can use the pointer to determine a signature for the current state of the hooked function and can use the process identifier to retrieve a stored/authenticated signature for the process from the whitelist 318. The hook function can then determine whether the current state of the function (e.g., process #1) in memory 314 is authentic/valid and should be permitted to be executed. If so, control can be returned to the process (e.g., process #1) for normal loading and execution. If not, the security middleware layer 320b can return an error (blocking the process from being loaded/executed), can retrieve forensic information related to the blocked process, can store the forensic information, and can transmit a report of the incident.

Other programs running on the controller 302 may not be aware of the use of hooks and can continue to call the original function, allowing for this change to be minimal in terms of code change and system impact. The example middleware security layer 320b used in combination with the whitelist 318 can then intercept function calls to determine whether they are permitted under the security policy for the controller 302. Hooks can be used to implement endpoint security with a variety of additional advantages. For example, hooks can require no additional effort on behalf of the manufacturer/vendor. Hooks can be registered with the kernel OS 310 without needing changes to the OS 310 by its developers. On the OS level, the security layer 320b can, for example, be a kernel module that can either be built with the kernel sources or inserted as an external module.

In another example, hooks can allow the security layer to be easily adapted to different operating systems. For instance integration into a new OS can be on the hooking level, which can allow the rest of the security code to stay the same across different operating systems. This can allow a strong decoupling of the security enforcement layer from the specific OS internals.

In a further example, the hooks can be placed at a beneficial level to enforce security policies. For example, by placing the security layer 320b and its hooks at the kernel level 320a, security decisions can be made at the place with the highest privileges, which can thwart attempts by hackers to elevate privileges to disable the security layer 320b. Additionally, the kernel level 320a is the level at which such security decisions are made anyway, so the security middleware layer 320b is an appropriate fit. For instance, when a process tries to load, the kernel 320a checks its permissions. The hook-based security layer 320b simply enhances this check with cryptographic signature verification, thus implementing the whitelist 318.

In another example, the security layer 320b can be implemented with minimal code size and performance impact on the controller 302. Extending the kernel 320a at the point of the decision making allows the code, which can include kernel hooking techniques and few logic points that enforce security policy 316, to be concise.

Referring now to FIG. 3B, an example process whitelist 350 is depicted. The example whitelist 350 includes a number of fields for each process, such as a unique identifier 352 (e.g., system-level process identifier), a process name 354 (e.g., name of the executable file), a file type 356 (e.g., binary, script, executable library), and a digital signature 358 (e.g., SHA256 signature, checksums, cyclic redundancy check (CRC) signature). The digital signature 358 can be generated during the automatic security policy generation described above with regard to FIG. 1A. The whitelist 350 can be maintained on the controller 302 using one or more security features, such as being stored as read only with root level permissions and/or being encrypted on the controller 302. Example entries 360a-n in the whitelist 350 are also depicted.

Referring to FIG. 3C, an example technique 370 is depicted for performing process verification using a process whitelist. The example technique 370 can be performed on any of a variety of controllers, such as the controller 114, the ECUs 156a-n, the controller 200, and/or the controller 302 described above.

A process call is received (372). For example, the process verification agent 208 can receive a process call for a hooked function in the kernel 226. The process call can include information identifying the process (e.g., name, unique identifier) and can include a pointer to the process in memory. A stored process signature can be obtained (374). For example, the process verification agent 208 can retrieve a verified signature for the process from the process whitelist 218 using the information identifying the process. A signature for the called process can be determined (376). For example, the process verification agent 208 can determine a signature for the process using the pointer to the process in memory. A determination can be made as to whether the signatures match (378). For example, the process verification agent 208 can perform a comparison operation to determine whether the stored signature and the determined signature are the same.

If they are the same, that indicates that the called process is valid and should be permitted to operate. The process call that was intercepted can be transmitted back to the processor (380), information on the process call can be logged (382), and the controller can continue with normal operation (384). In contrast, if they are not the same (do not match), then an error can be returned (386) which can cause the process to be blocked, and information on the blocked process can be reported and logged (388). The controller can continue with normal operation after a process is blocked (384).

FIGS. 4A-C depict examples implementations of a network firewall and port protection agent by a security middleware layer on a controller. FIG. 4A is a conceptual diagram depicting an example of network firewall and port verification, FIG. 4B depicts an example whitelist that can be used for network firewall and port verification, and FIG. 4C is a flowchart of an example technique for performing network firewall and port verification. The examples depicted in FIGS. 4A-C can be implemented, for example, by the network firewall 212 and the port protection agent 214 using the network whitelist 222 and the port whitelist 224, which can be generated automatically for the controller 200 based on automatic security policy generation, as described above with regard to FIG. 1A.

Referring to FIG. 4A, an example system 400 is depicted with an example controller 402 using network and port whitelists 418 that are part of a custom security policy 416 for the controller 402 to block a malicious network process 406. In this example, the network processes #1-#N (304*a*-*n*)—processes that are involved in network communication, such as those that are part of, call, or otherwise invoke the networking services 232 and/or the peripheral devices 234—are included on the whitelist 418 for the controller 402, but the process #2 has a known exploit that is used by hackers to onboard a network packet with a small footprint malware 408 that then, if executed, could download a larger malicious binary that may be launched as a privileged process. A network firewall and a port protection agent that are part of a security middleware layer 420*b* can block the small footprint malware 408 and the larger the malicious process 406 from being permitted entry onto and execution by the controller 402 because they are provided through network transmissions not included in the whitelist 418—effectively blocking the malicious process 406 and the small footprint malware 408 from ever getting onto the controller 402, let alone from being executed by the CPU 412 and used to corrupt the memory 414 (e.g., buffer overrun attack).

For example, the security middleware layer 420*b* can integrate the whitelist 418 into the system's socket layer (or equivalent) by hooking socket layer processes in the kernel 420*a* to verify network packet transmissions (420*c*). The security middleware layer 420*b* can apply the network firewall and port protection whitelists 418 to control inbound and outbound connections for the controller 402. Inbound rules can specify allowed ports (e.g., port 80) and source IP addresses for selected system processes 404*a*-*n*. Outbound rules can define specific ports and destination IP addresses for specific system processes 404*a*-*n*. Connections flowing through the security middleware layer 420*b* can be logged, for example, by an auditing agent that is part of the security middleware layer 420*b*. Similar to the process whitelist 318, the network and port whitelist 418 can be generated through automatic security policy generation for the controller 402, as described above with regard to FIG. 1A.

The security middleware layer 420*b* and whitelist 418 can additionally be used to secure the controller 402 with regard to devices that include physical access ports, such as USB and OBD. For example, the security middleware layer 420*b* can limit peripheral device file access to specific file types (e.g. media files) and/or can forbid running object files from unidentified sources. Such rules can enable safe usage of peripheral devices, such as through sharing photos and videos, and/or running software updates from a peripheral device, only if the device is identified/authorized as a legitimate/permitted peripheral device by a manufacturer/vendor for the controller 402, as designated on the whitelist 418.

The security middleware layer 420*b* is depicted as implementing network packet verification using hooks. Additional and/or alternative techniques for implementing process verification are also possible. With regard to the depicted example, hooks registered with the kernel 420*a* and are used to redirect network function calls in the kernel 420*a* (the hooked function call) to a process verification function (the hooking function). Accordingly, when the example network process #1 is called, the registered hooks cause the registered hook function (process verification agent 208) to be invoked and to perform packet verification 420*c* for the packet being transmitted or received through the network process #1. For example, the hook function can receive as parameters an identifier for the hooked function (e.g., unique identifier for process #1) and a pointer to the network packet in the memory 414 that is being transmitted or received through the hooked function. The hook function (process verification agent 208) can use the pointer to access information for the packet, such as the source or destination IP address, the port over which the communication is being transmitted, and information on the payload that is being transmitted (e.g., file type), and can use the process identifier to retrieve a stored/authenticated network parameters (e.g., source/destination IP address, port, payload type) for the process from the whitelist 418. The hook function can then determine whether the network packet being transmitted/received through the function (e.g., process #1) in memory 414 is authentic/valid and should be permitted to be transmitted/received. If so, control can be returned to the process (e.g., process #1) for continued receipt/transmission of the network packet continues. If not, the security middleware layer 420*b* can return an error (blocking the network packet from being received/transmitted), can retrieve forensic information related to the blocked network packet, can store the forensic information, and can transmit a report of the incident.

Other programs running on the controller 402 may not be aware of the use of hooks and can continue to call the original network function, allowing for this change to be minimal in terms of code change and system impact. The example middleware security layer 420*b* used in combination with the whitelist 418 can then intercept network function calls to determine whether network packets are permitted under the security policy for the controller 402. Hooks used in this manner can provide a variety of advantages, such as those described above with regard to FIG. 3A.

Referring now to FIG. 4B, an example network and port whitelist 450 is depicted. The example whitelist 450 includes a number of fields for each network process, such as a unique identifier 452 (e.g., system-level process identifier), a process name 454 (e.g., name of the executable file), permitted file type 456 (e.g., types of files and/or content that are permitted to be transmitted by the process), one or more permitted ports 458 (e.g., ports over which network traffic through the process is permitted), and/or one or more permitted inbound/outbound IP addresses 460 (e.g., IP address to or from which network traffic via the process is permitted). The fields 452-460 can be generated during the automatic security policy generation described above with regard to FIG. 1A. The whitelist 450 can be maintained on the controller 402 using one or more security features, such as being stored as read only with root level permissions and/or being encrypted on the controller 402. Example entries 462*a*-*n* in the whitelist 450 are also depicted.

Referring to FIG. 3C, an example technique 470 is depicted for performing network packet verification using a network and port whitelist. The example technique 470 can be performed on any of a variety of controllers, such as the controller 114, the ECUs 156*a*-*n*, the controller 200, the controller 302, and/or the controller 402 described above.

A network process call is received (472). For example, the network firewall 212 and/or port protection agent 214 can receive a process call for a hooked network function in the kernel 226. The process call can include information identifying the process (e.g., name, unique identifier) and can include a pointer to the network packet to be transmitted/received in memory. A stored network process port and IP address can be obtained (474). For example, the network firewall 212 and/or port protection agent 214 can retrieve verified port(s) and IP address(es) for the process from the process whitelists 222-224 using the information identifying the process. A port and IP address for the called process can be determined (476). For example, the network firewall 212 and/or port protection agent 214 can determine a port and IP address for a network packet being transmitted/received by the network process using the pointer to the process in memory. A determination can be made as to whether the port and IP addresses match (478). For example, the network firewall 212 and/or port protection agent 214 can perform a comparison operation to determine whether the stored port and IP address match the identified port and IP address in the network packet.

If they are the same, that indicates that the network packet is valid and should be permitted to be received/transmitted. The network process call that was intercepted can be transmitted back to the processor (480), information on the process call can be logged (482), and the controller can continue with normal operation (484). In contrast, if they are not the same (do not match), then an error can be returned (486) which can cause the network packet to be blocked, and information on the blocked network packet can be reported and logged (488). The controller can continue with normal operation after a process is blocked (484).

The technique 370 can additionally/alternatively be performed in combination with the technique 470. For example, a network process can be verified that it is authentic/valid (technique 370) in addition to the network packet that is being transmitted through the network process being verified (technique 470).

FIGS. 5A-B depict examples implementations of a stack inspection agent that is part of a security middleware layer on a controller. FIG. 5A is a conceptual diagram depicting an example of a stack inspection agent using a policy graph, and FIG. 5B is a flowchart of an example technique for performing stack inspection. The examples depicted in FIGS. 5A-B can be implemented, for example, by the stack inspection agent 210 using the function graph 220, which can be generated automatically for the controller 200 based on automatic security policy generation, as described above with regard to FIG. 1A.

Referring to FIG. 5A, an example system 500 is depicted that includes an example controller 502 with a security middleware layer 518 that includes a stack inspection agent 520 that uses a policy graph 522 to verify that the sequence of processes being executed by the controller 502 is valid. As with the example controller 200, the controller 502 includes one or more processors 504 and memory 506 that includes a software stack 508 identifying a sequence processes to be executed by the one or more processors 504. In the depicted example 510, the function "f1" called the function "f3," which in turn called the process "f9." The one or more processors will execute the functions in the stack 508 from the top down—meaning function f9, then f3, then f1.

The operating system 514 for the controller 502 includes an application layer 516 (application layer 202), a security middleware layer 518 (security middleware layer 206), and a kernel 524 (226). The policy graph 522 is used by the stack inspection agent 520 to verify that the sequence of processes in the software stack 508 is valid—meaning that the functions/processes that have called each other are permitted to make such calls under the approved/designed operation of the controller 502. In the example policy graph 512, the current snapshot 510 of the stack 508 does permit this sequence of function calls. For instance, the function f1 is permitted to call functions f2 and f3, and the function f3 is permitted to call function f9. The stack inspection agent 520 can start with the function at the bottom (f1) of the stack 508 traverse the graph 522 based on the snapshot 510 to verify whether each of the function calls is permitted.

The stack inspection agent 520 can be called in a number of different ways. For example, the controller 502 can include a non-maskable interrupt 512 can be a repeating process on the controller 502 that that sends out an interrupt signal are regular intervals of time in a way that cannot be corrupted by malware. The stack inspection agent 520 can register with the kernel 524 to be triggered to run every time the non-maskable interrupt 512 provides its interrupt signal. When run, the stack inspection agent 520 can take a snapshot (510) of the software stack 508 and can verify whether the current sequence of processes is permitted on the controller 502 using the policy graph 522. In such an arrangement with the non-maskable interrupt 512, the stack inspection agent 520 can be run many times each second.

Additionally and/or alternatively, the stack inspection agent 520 can be run as part of the hooks described above with regard to FIGS. 3A-C and 4A-C. For example, the stack inspection agent 520 can be run when a process is called and can evaluate whether the process call is permitted in light of the current snapshot 510 of the stack 508 and the policy graph 522.

Referring to FIG. 5B, an example technique 550 is depicted for performing stack inspection using a policy graph of permitted process sequences. The example technique 550 can be performed on any of a variety of controllers, such as the controller 114, the ECUs 156a-n, the controller 200, the controller 302, the controller 402, and/or the controller 502 described above.

The stack inspection agent can be invoked (552). For example, the stack inspection agent 520 can be invoked by the non-maskable interrupt 512 and/or by hooked process calls. Once invoked, the stack inspection agent can obtain a snapshot of the software stack (554). For example, the stack inspection agent 520 can obtain the snapshot 510 of the software stack 508. Using the snapshot, the stack inspection agent can identify a process from the stack in a policy graph (556) and another process that is called by the identified process (558). For example, with the example snapshot 510, the stack inspection agent 520 can identify the process f1 and another process (f3) called by f1. The stack inspection agent can determine whether the sequence of process calls is permitted using the policy graph (560). If the sequence of process calls is not permitted, then the sequence can be reported and logged (562) and remedial action can be taken (564). Remedial action can include, for example, blocking the unpermitted process to be called/run, resetting the controller (if it can be done safely without affecting device/system operation), and/or other appropriate actions.

If the process sequence is permitted (or after taking remedial action), the stack inspection agent can move to the next process in the stack snapshot (566) and can determine whether that process made any additional process calls (568). If there are additional process call (not at the top of the stack yet), then the step 556 can be repeated. If there are no more additional process calls (at the top of the stack), then the technique can end and continue with normal controller operation.

FIGS. 6A-B depict examples implementations of anti-tampering agents that are part of a security middleware layer on a controller. FIG. 6A is a conceptual diagram depicting an example of multiple anti-tampering agents being used to verify secure operation of a security middleware layer, and FIG. 6B is a flowchart of an example technique for performing anti-tampering verification. The examples depicted in FIGS. 6A-B can be implemented, for example, by the security middleware layer 206 to verify operation of its verification agents/layers 208-224, which can be generated automatically for the controller 200 based on automatic security policy generation, as described above with regard to FIG. 1A.

Referring to FIG. 6A, an example system 600 is depicted that includes a controller 602 with one or more processors 604, memory 606 and a non-maskable interrupt 608, and an operating system 614 that includes an application layer 616, a security middleware layer 618, and a kernel 630. The security middleware layer 618 includes the security layers described above with regard to FIGS. 2-5, including a process verification agent 620, a stack inspection agent 622, a network firewall 624, and a port protection agent 626. The security middleware layer 618 additionally includes one or more anti-tampering agents 628 that are programmed to repeatedly check and verify that the security layers 620-626 are operating on the controller 602. For example, the one or more anti-tampering agents 628 can check one or more locations in memory 606 to verify that the security layers 620-626 are running.

In another example, the one or more anti-tampering agents can verify that whitelist hooks have not been removed and prevent an attacker from removing policy enforcement at runtime. In the event that a hook has been removed or that a portion of the policy has somehow been removed/disabled, the anti-tampering module can send an alert, which can cause any of a variety of actions to occur (e.g., notify vendor/manufacturer, seek authorization to restart/reset controller 602, notify the driver/user of the device/vehicle). In some instances, the vendor/manufacturer may additionally authorize the controller 602 to automatically generate security alerts on the device (e.g., vehicle), such as a security light that may be displayed on the vehicle's dash, and/or to automatically remedy the security issue (e.g., restart the controller 602 when such restarting will not pose a safety risk to the vehicle).

In some instance, there may be multiple anti-tampering agents 628 that are running concurrently that each check each other in addition to the security policies and their enforcement 620-626, so that if one of the anti-tampering agents 628 is compromised there is redundancy to identify threats. This service 628 can also be responsible for verifying and ensuring secure storage is provided for encrypted data used on the controller 602. When available, secure storage can be provided via hardware services and can be made available to software components on the controller 602 as needed. When securely stored data is requested by verified and authorized software components, it is decrypted and made available to those components. Before the data is flushed from the system, however, there is a possibility for malicious code with sufficient privileges to read the memory with the decrypted data. To protect against this, the anti-tampering agents 628 can monitor for processes attempting to access data in a secure area (decrypted data not yet flushed from memory) and, if such attempts are detected, can be identified as malicious, reported out, and the system can be reset FIG. 6A includes an example in which multiple security agents A-N (632a-n) are providing redundant security checks. In this example, a first agent 632a is verifying the status of the security layers 620-626, as indicated by 634. Multiple additional agents 632b-n are subsequently providing a daisy-chain of verification starting with the first agent 632a and extending down the chain (as indicated by 636a-n). If any one of these agents 636a-n is unable to verify operation of its target, it can provide an alert that can indicate that the security middleware layer 618 may have been compromised.

Referring to FIG. 6B, an example technique 650 is depicted for performing anti-tampering verification of a security middleware layer. The example technique 650 can be performed on any of a variety of controllers, such as the controller 114, the ECUs 156a-n, the controller 200, the controller 302, the controller 402, the controller 502, and/or the controller 602 described above.

The one or more anti-tampering agents can be invoked (652). For example, the anti-tampering agents 632a-n can be launched when the controller boots and can be invoked on timed intervals, such as based on the non-maskable interrupt 608. The components in the middleware security layer 654 can be identified (654), a determination can be made as to whether those components are running (656), and verification of the components can be performed (658). If the security middleware layers/agents cannot be verified, then a security layer operation error can be logged and reported out (670) and remedial action can be taken (672), such as providing an alert/warning on the device and/or restarting the controller (if it can be performed without affecting the performance of the device/system). If the components are verified, then operation of the controller can continue (674).

FIG. 7 is an example technique 700 for providing secure operation and malware prevention on a controller using a security middleware layer. The example technique 700 can be performed on any of a variety of controllers, such as the controller 114, the ECUs 156a-n, the controller 200, the controller 302, the controller 402, the controller 502, and/or the controller 602 described above. The technique 700 combines the security layers described above individually across FIGS. 3-6, which can additionally/alternatively be combined in various other sub-combinations.

Process verification can be performed on a controller using a security middleware layer with a custom security policy (702), as described above with regard to FIGS. 3A-C and in the example technique 370. Network firewall protections can be performed on the controller using the security middleware layer with the custom security policy (704), as described above with regard to FIGS. 4A-C and in the example technique 470. Port protections can be performed on the controller using the security middleware layer with the custom security policy (706), as described above with regard to FIGS. 4A-C and in the example technique 470. Stack inspection can be performed on the controller using the security middleware layer with the custom security policy (708), as described above with regard to FIGS. 5A-B and in the example technique 550. Anti-tampering techniques can be performed on the controller using the security middleware layer with the custom security policy (710), as described above with regard to FIGS. 6A-B and in the example technique 650.

FIG. 8 is a block diagram of example computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 800 is further intended to represent any other typically non-mobile devices, such as televisions or other electronic devices with one or more processors embedded therein or attached thereto. Computing device 850 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 800 includes a processor 802, memory 804, a storage device 806, a high-speed controller 808 connecting to memory 804 and high-speed expansion ports 810, and a low-speed controller 812 connecting to low-speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high-speed controller 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, or memory on processor 802.

The high-speed controller 808 manages bandwidth-intensive operations for the computing device 800, while the low-speed controller 812 manages lower bandwidth-intensive operations. Such allocation of duties is an example only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed bus 814. The low-speed bus 814 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as computing device 850. Each of such devices may contain one or more of computing devices 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The computing device 850 may also be provided with a storage device, such as a micro-drive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the computing device 850, such as control of user interfaces, applications run by computing device 850, and wireless communication by computing device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of computing device 850 with other devices. External interface 862 may provide, for example, for wired communication (e.g., via a docking procedure) or for wireless communication (e.g., via Bluetooth® or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to computing device 850 through expansion interface 872, which may include, for example, a subscriber identification module (SIM) card interface. Such expansion memory 874 may provide extra storage space for computing device 850, or may also store applications or other information for computing device 850. Specifically, expansion memory 874 may include instructions to carry out or supplement the processes described above, and may include secure information also. Thus, for example, expansion memory 874 may be provide as a security module for computing device 850, and may be programmed with instructions that permit secure use of computing device 850. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852.

Computing device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 868 (e.g., a radio-frequency transceiver). In addition, short-range communication may occur, such as using a Bluetooth®, WiFi, or other such transceiver (not shown). In addition, GPS receiver module 870 may provide additional wireless data to computing device 850, which may be used as appropriate by applications running on computing device 850.

Computing device 850 may also communicate audibly using audio codec 860, which may receive spoken information from a user and convert it to usable digital information. Audio codec 860 may likewise generate audible sound for a user, such as through a speaker, e.g., in a handset of computing device 850. Such sound may include sound from voice telephone calls, may include recorded sound (e.g., voice messages, music files, etc.) and may also include sound generated by applications operating on computing device 850.

The computing device 850 may be implemented in a number of different forms, as shown in the figure. For example, it may be implemented as a cellular telephone 880. It may also be implemented as part of a smartphone 882, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A non-transitory computer readable medium including instructions that, when executed by at least one processor, cause the at least one processor to perform operations for deploying embedded runtime whitelist policies in an ECU (electronic control unit) in a vehicle, comprising:
   maintaining, as embedded software within the ECU in the vehicle, a plurality of whitelist polices for runtime functionality of the ECU;
   wherein a first of the plurality of whitelist policies defines permitted runnable binaries for ECU software installed on the ECU;
   wherein a second of the plurality of whitelist policies defines permitted function sequences in a memory of the ECU; and
   wherein the first or second of the plurality of whitelist policies includes one or more signatures corresponding to one or more verified process calls;
   invoking, by at least one of the plurality of whitelist policies, a stack inspection operation;
   detecting, based on the invoking, a requested operation to be performed by the ECU as part of an identified runtime process call;
   identifying a process identifier associated with the identified runtime process call; determining a verified signature from among the one or more signatures based on the process identifier;
   determining that the requested operation violates at least one of the first or second of the plurality of whitelist polices, wherein the determining is based on comparing a signature (i) associated with the identified runtime process call and (ii) based on a pointer to a location in the memory with the verified signature; and
   blocking, based on the determination, the requested operation from being performed by the ECU.

2. The non-transitory computer readable medium of claim 1, wherein the plurality of whitelist policies are based on factory settings of the ECU software.

3. The non-transitory computer readable medium of claim 1, wherein the plurality of whitelist policies are based on a static analysis of the ECU software.

4. The non-transitory computer readable medium of claim 1, wherein the permitted runnable binaries are defined by unique signatures associated with each runnable binary.

5. The non-transitory computer readable medium of claim 1, wherein the plurality of whitelist polices are developed in a build environment associated with the embedded software.

6. The non-transitory computer readable medium of claim 1, wherein the plurality of whitelist polices further comprise one or more network firewall policies.

7. The non-transitory computer readable medium of claim 1, wherein the operations further comprise generating an alert identifying the requested operation.

8. The non-transitory computer readable medium of claim 7, wherein the alert identifies a trail of an attack associated with the requested operation.

9. The non-transitory computer readable medium of claim 7, wherein the alert identifies a source of the requested operation.

10. A computer-implemented method for deploying embedded runtime whitelist policies in an ECU (electronic control unit) in a vehicle, the method comprising:
    maintaining, as embedded software within the ECU in the vehicle, a plurality of whitelist polices for runtime functionality of the ECU;
    wherein a first of the plurality of whitelist policies defines permitted runnable binaries for ECU software installed on the ECU;
    wherein a second of the plurality of whitelist policies defines permitted function sequences in a memory of the ECU; and
    wherein the first or second of the plurality of whitelist policies includes one or more signatures corresponding to one or more verified process calls;
    invoking, by at least one of the plurality of whitelist polices, a stack inspection operation;
    detecting, based on the invoking, a requested operation to be performed by the ECU as part of an identified runtime process call;
    identifying a process identifier associated with the identified runtime process call; determining a verified signature from among the one or more signatures based on the process identifier;
    determining that the requested operation violates at least one of the first or second of the plurality of whitelist polices, wherein the determining is based on comparing a signature (i) associated with the identified runtime process call and (ii) based on a pointer to a location in the memory with the verified signature; and
    blocking, based on the determination, the requested operation from being performed by the ECU.

11. The computer-implemented method of claim 10, wherein the plurality of whitelist policies are based on factory settings of the ECU software.

12. The computer-implemented method of claim 10, wherein the plurality of whitelist policies are based on a static analysis of the ECU software.

13. The computer-implemented method of claim 10, wherein the permitted runnable binaries are defined by unique signatures associated with each runnable binary.

14. The computer-implemented method of claim 10, wherein the plurality of whitelist polices are developed in a build environment associated with the embedded software.

15. The computer-implemented method of claim 10, wherein the plurality of whitelist polices further comprise one or more network firewall policies.

16. The computer-implemented method of claim 10, further comprising generating an alert identifying the requested operation.

17. The computer-implemented method of claim 16, wherein the alert identifies a trail of an attack associated with the requested operation.

18. The computer-implemented method of claim 16, wherein the alert identifies a source of the requested operation.

* * * * *